United States Patent
DeMoss et al.

(10) Patent No.: US 7,616,436 B2
(45) Date of Patent: Nov. 10, 2009

(54) SYSTEMS AND METHODS FOR MOUNTING COMPONENTS OF AN INFORMATION HANDLING SYSTEM

(75) Inventors: Jeffrey DeMoss, Austin, TX (US); John T. Morrison, Round Rock, TX (US); Robyn R. Reed, Pflugerville, TX (US); Quoc Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 243 days.

(21) Appl. No.: 11/804,208

(22) Filed: May 17, 2007

(65) Prior Publication Data

US 2008/0285225 A1 Nov. 20, 2008

(51) Int. Cl.
*G06F 1/16* (2006.01)
(52) U.S. Cl. .............................. 361/679.34; 361/679.35; 361/679.36; 312/223.1; 312/223.2
(58) Field of Classification Search ............... 312/223.1, 312/223.2
See application file for complete search history.

(56) References Cited

U.S. PATENT DOCUMENTS

| | | | | |
|---|---|---|---|---|
| 5,131,619 A | * | 7/1992 | Daugherty et al. | .......... 248/635 |
| 5,360,236 A | * | 11/1994 | Brown | .......... 248/672 |
| 5,366,200 A | | 11/1994 | Scura | |
| 6,912,127 B2 | | 6/2005 | Hutchinson et al. | |
| 7,134,203 B2 | | 11/2006 | Hutchinson et al. | |
| 7,369,402 B2 | * | 5/2008 | Huang | .................. 361/679.33 |
| 2002/0051338 A1 | | 5/2002 | Jiang et al. | |
| 2004/0113339 A1 | | 6/2004 | Masterson et al. | |
| 2004/0228073 A1 | * | 11/2004 | Chuang | ...................... 361/679 |
| 2005/0206058 A1 | | 9/2005 | Masterson et al. | |
| 2006/0023416 A1 | * | 2/2006 | Chen | ......................... 361/685 |
| 2006/0045616 A1 | | 3/2006 | Sura et al. | |

\* cited by examiner

*Primary Examiner*—Jayprakash N Gandhi
*Assistant Examiner*—Anthony Q Edwards
(74) *Attorney, Agent, or Firm*—O'Keefe, Egan, Peterman & Enders LLP

(57) ABSTRACT

Systems and methods for mounting components of an information handling system such as a desktop computer or other desktop information handling system. The supported components may be motorized or other vibration-producing components that are supported and mounted directly or indirectly to a mounting structure of an information handling system using an isolation apparatus that is configured on a first end with one or more insertable snap-fit retaining features configured to retainably engage one or more internal retaining features of the mounting structure in order to fixedly couple the isolation apparatus to the mounting structure, and that is configured on an opposing second end with one or more insertable pins that may in turn be employed to couple the isolation apparatus to the vibration-producing component.

22 Claims, 11 Drawing Sheets

SYSTEMS AND METHODS FOR MOUNTING COMPONENTS OF AN INFORMATION HANDLING SYSTEM

FIELD OF THE INVENTION

This invention relates generally to information handling systems and, more particularly, to mounting components of information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often provided with components such as motorized hard drives that store data for the system. Hard drives typically generate vibration which passes to the system chassis, thus inducing acoustic issues if not correctly isolated. Hard drives have been mounted within a desktop information handling system using elastomeric grommets or isolators for isolation. The elastomeric grommets or isolators are typically connected to the hard drive component using threaded fasteners or pins. In one example, an elastomeric isolator includes a circumferential groove that is configured to engage the edges of a tray mechanism. To install the elastomeric isolator, it is first inserted within an enlarged diameter insertion position of an aperture defined in the tray mechanism and then slid to a narrowed diameter portion of the aperture to effect positive engagement of the isolator circumferential groove with the wall material of the tray mechanism. Due to the use of threaded fasteners and/or the requirement for insertion and sliding, mounting of hard drive components using conventional elastomeric grommets or isolators is time and labor intensive.

SUMMARY OF THE INVENTION

Disclosed herein are systems and methods for mounting components (e.g., motorized or other vibration-producing component such as a hard disk drive, floppy disk drive, optical disk drive, tape drive or other data drive component, a fan assembly, etc.) of an information handling system such as a desktop computer or other desktop information handling system. In one embodiment, a motorized or other vibration-producing component may be supported and mounted directly or indirectly to a mounting structure (e.g., chassis or chassis mounting module such as drive caddy) of an information handling system using an isolation apparatus that is configured to dampen vibration from the vibration-producing component so as to reduce or substantially prevent transfer of vibration from the vibration-producing component to the chassis of the information handling system. Such an isolation apparatus may be configured on a first end with one or more insertable snap-fit retaining features configured to retainably engage one or more internal retaining features of the mounting structure in order to fixedly couple the isolation apparatus to the mounting structure, and may be configured on an opposing second end with one or more insertable pins that may in turn be employed to couple the isolation apparatus to the vibration-producing component.

In the practice of the disclosed systems and methods, an isolation apparatus may be provided with one or more acoustic dampening materials (e.g., elastomeric materials) that are configured to reduce or substantially prevent transfer of vibration from the vibration-producing component to the mounting structure. The dampening materials may be provided as an elastomeric overmold to an insertable pin feature, that may be manufactured of a sufficiently rigid material (e.g., metal, plastic, fiberglass, etc.) that is suitable for slidable or threadable insertion into a complementary opening provided within a vibration-producing component and that is suitably rigid for supporting the vibration-producing component relative to the chassis or chassis mounting module.

In one exemplary embodiment, a vibration-producing component such as a computer hard drive may be supported on multiple sides relative to a mounting structure by multiple isolation apparatus (e.g., two isolation apparatus attached to each of the opposing sides of the vibration-producing component). Each of the multiple isolation apparatus may include an insertable pin that outwardly extends on first end of the apparatus, each pin having an elastomeric overmold body having at least one insertable retaining feature (e.g., snap-fit retaining feature) that extends outwardly at an opposing second end of the apparatus. An insertable pin of each of the isolation apparatus may be inserted within a respective complementary-sized opening provided within a side of the vibration-producing component, and the opposing insertable retaining feature of each of the isolation apparatus may be inserted (e.g., snapped) into a respective and complementary-sized opening provided with a chassis or chassis mounting module (e.g., drive caddy such as caddy for a hard drive, optical disk drive, floppy disk drive, tape drive or other type of data drive component) of an information handling system. When so supported within an information handling system chassis or within a chassis mounting module that is itself mounted within an information handling system chassis, the multiple isolation apparatus isolates the vibration-producing component from the chassis, thus dampening its vibration.

Advantageously, the disclosed combination of an insertable retaining feature and an insertable pin may together be employed to mount a vibration-producing component to a mounting structure in a quick and easy manner that facilitates use in a high speed manufacturing scenario. In this regard, the disclosed isolation apparatus may be advantageously configured with a snap-fit feature that may be installed without the alignment and sliding movements required by conventional elastomeric isolators. Rather, the snap-fit feature may be simply inserted and snapped into place in an efficient manner that facilitates high speed manufacturing operations, saving time and cost compared to the time and cost required to install conventional vibration isolating solutions.

In one respect, disclosed herein is an information handling system, including: at least two isolation apparatus, each of the isolation apparatus having a first end that includes an insertable metal pin and a second end that includes a body of elastomeric material, the elastomeric material defining an insertable snap-fit retaining feature on the second end of the isolation apparatus; a vibration-producing component, the vibration-producing component having first and second opposing sides, at least one opening being defined in each of the first and second sides; first and second sidewalls supported in spaced relationship to each other, each of the first and second sidewalls having at least one opening defined therein, the opening being provided with at least one internal retaining feature configured to receive and retainably engage the insertable snap-fit retaining feature of one of the isolation apparatus. The vibration-producing component may be disposed between the first and second sidewalls such that the opening defined in the first side of the vibration-producing component is disposed adjacent the opening defined in the first sidewall, and such that the opening defined in the second side of the vibration-producing component is disposed adjacent the opening defined in the second sidewall. An insertable metal pin of a first one of the isolation apparatus may be at least partially received in the opening defined in the first side of the vibration-producing component. A body of the first one of the isolation apparatus may be at least partially received in the opening defined in the first sidewall, and the internal retaining feature of the opening defined in the first sidewall may be retainably engaged by the insertable snap-fit retaining feature of the first one of the isolation apparatus. An insertable metal pin of a second one of the isolation apparatus may be at least partially received in the opening defined in the second side of the vibration-producing component. A body of the second one of the isolation apparatus may be at least partially received in the opening defined in the second sidewall, and the internal retaining feature of the opening defined in the second sidewall may be retainably engaged by the insertable snap-fit retaining feature of the second one of the isolation apparatus. The vibration-producing component may be in this way substantially vibrationally isolated from the first and second sidewalls.

In another respect, disclosed herein is an assembly for an information handling system, including: an information handling system component, the information handling system component having at least one opening defined therein; at least one isolation apparatus having first and second opposing ends and including a body of vibration-dampening material, an insertable pin extending from the first end of the isolation apparatus, and at least one insertable snap-fit retaining feature provided adjacent the second end of the isolation apparatus; a mounting structure having at least one opening defined therein, the opening provided with at least one internal retaining feature configured to receive and retainably engage the insertable snap-fit retaining feature of the isolation apparatus. The insertable pin of the isolation apparatus may be at least partially received in the at least one opening defined in the information handling system component. The body of the isolation apparatus may be at least partially received in the at least one opening of the mounting structure and the internal retaining feature of the mounting structure opening may be retainably engaged by the insertable snap-fit retaining feature of the isolation apparatus.

In another respect, disclosed herein is a method for mounting an information handling system component, including: providing an information handling system component, the information handling system component having at least one opening defined therein; providing at least one isolation apparatus having first and second opposing ends and including a body of vibration-dampening material, an insertable pin extending from the first end of the isolation apparatus, and at least one insertable snap-fit retaining feature provided adjacent the second end of the isolation apparatus; providing a mounting structure having at least one opening defined therein, the opening provided with at least one internal retaining feature configured to receive and retainably engage the insertable snap-fit retaining feature of the isolation apparatus; inserting the body of the isolation apparatus at least partially into the at least one opening of the mounting structure such that the internal retaining feature of the mounting structure opening is retainably engaged by the insertable snap-fit retaining feature of the isolation apparatus; and inserting the insertable pin of the isolation apparatus is at least partially into the at least one opening defined in the information handling system component.

DESCRIPTION OF ILLUSTRATIVE EMBODIMENTS

Figure 1A:
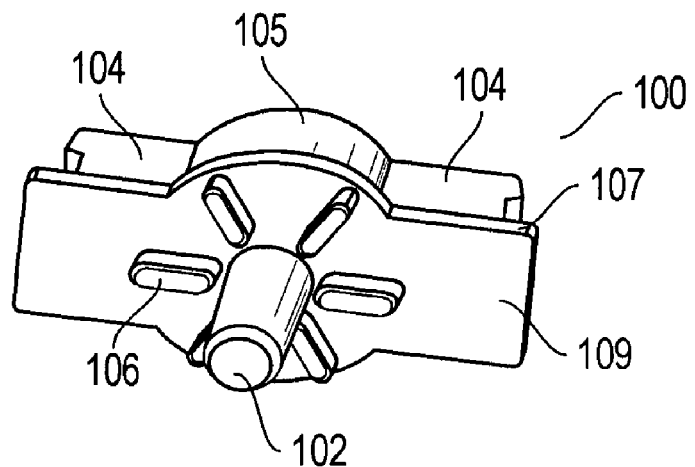
FIGS. 1A and 1B illustrate perspective views of an isolation apparatus according to one exemplary embodiment of the disclosed systems and methods.
Figure 1B:
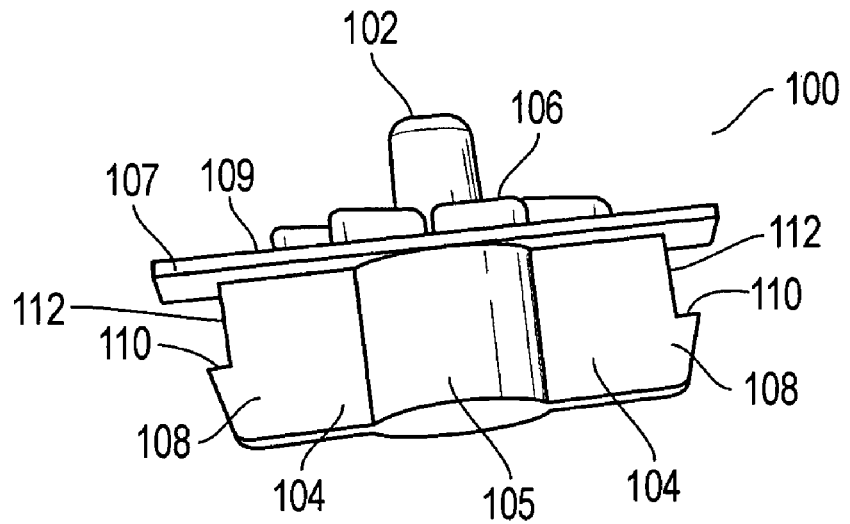

FIGS. 1A and 1B illustrate perspective views of an isolation apparatus or grommet 100 as it may be configured according to one exemplary embodiment of the disclosed systems and methods. In this embodiment, isolation apparatus 100 includes a cylindrical insertable pin 102 extending from a first end of apparatus 100 and that is coupled to a body 109 of dampening material that forms a second end of isolation apparatus 100 and that includes two snap-fit features that will be described further herein. Dampening material body 109 may be of any material suitable for at least partially dampening vibrations, e.g., an elastomeric material such as rubber, synthetic rubber, polymer materials, etc. Shape, dimensions and mass of dampening body 109 may also be varied as desired or needed to fit the characteristics of a particular application, e.g., size, weight and/or vibrational capability of a given vibration-producing component. The insertable pin 102 may be of any material (e.g., metal, plastic, fiberglass, etc.) that is suitably rigid for supporting a vibration-producing component in a manner that will be described elsewhere herein. Further, an insertable pin 102 may be of any other cross-sectional shape (e.g., square, oval, star-shaped, cylindrical and threaded, etc.) that is suitable for insertion into a complementary-shaped opening in a vibration-producing component. Body 109 may be attached or otherwise coupled to insertable pin in any suitable manner. For example, body 109 may be overmolded to insertable pin 102 or may be chemically (e.g., using suitable adhesive) or mechanically attached to insertable pin 102.

As shown in FIGS. 1A and 1B, body 109 is shaped in this exemplary embodiment with an insertion profile having semi-cylindrical portion 105 disposed between two opposing extending side sections 104, although any other insertion profile shape (e.g., cylindrical, oval, square, rectangular, etc.) suitable for including one or more retaining features and for insertion into a complementary-shaped opening of a chassis or chassis mounting component may be employed. In this embodiment, body 109 is also shown provided with an insertion-limiting feature in the form of lip 107 that acts to limit the extent to which body 109 may be inserted into a complementary-shaped opening of a mounting structure, and to cooperate with other retaining features of body 109 to securably retain body 109 within the complementary-shaped opening. In the illustrated embodiment, lip 107 extends around the periphery of body 109, although this is not necessary. Instead, an insertion limiting feature may be provided in any other shape and size that is suitable for limiting the extent to which body 109 may be inserted. Also shown present are optional ribs 106 that may be present for varying the stiffness of the isolation apparatus if so desired.

Figure 2A:
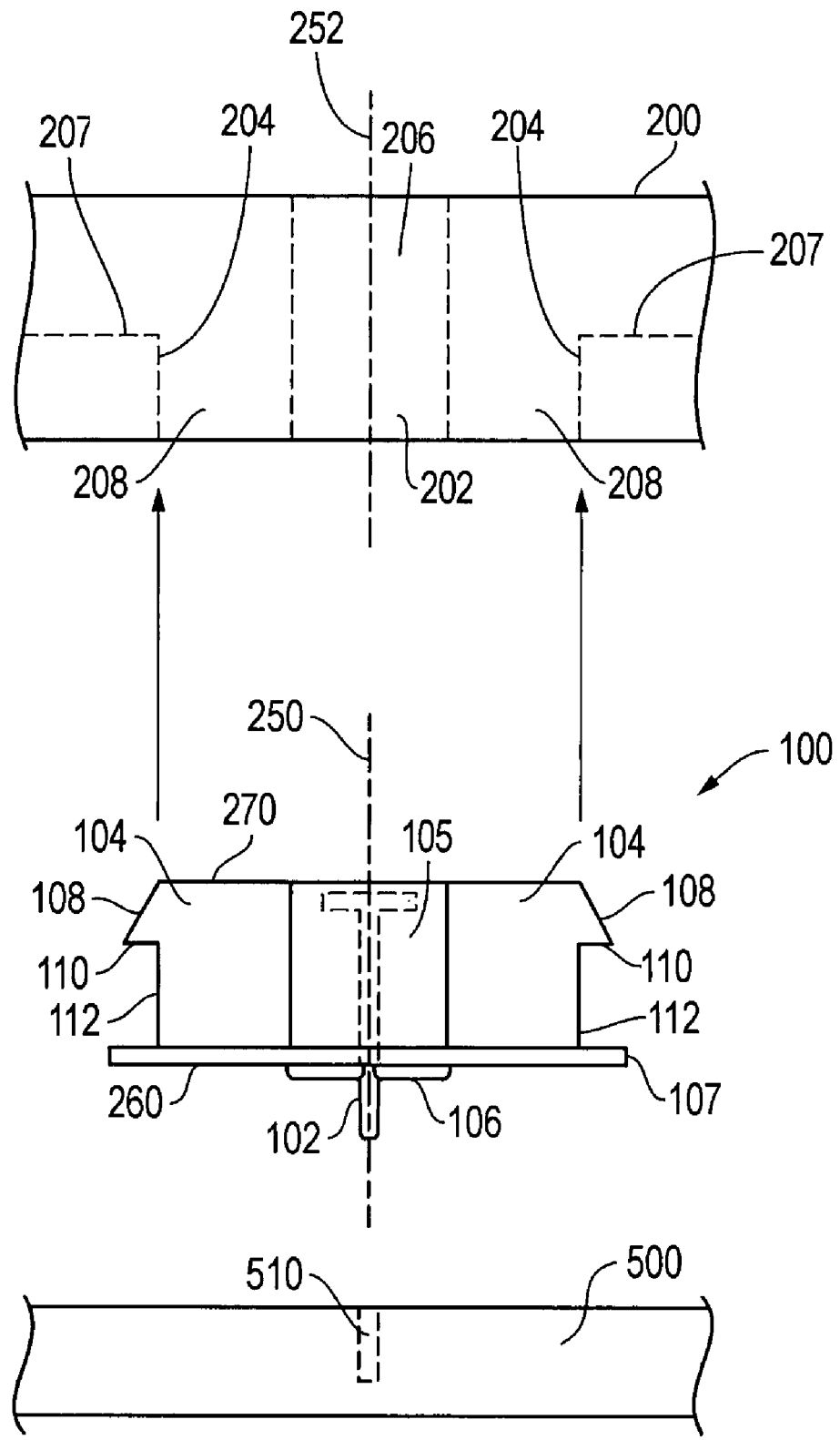
FIG. 2A shows a simplified side view of an isolation apparatus, mounting structure and information handling system component according to one exemplary embodiment of the disclosed systems and methods.
Figure 2B:
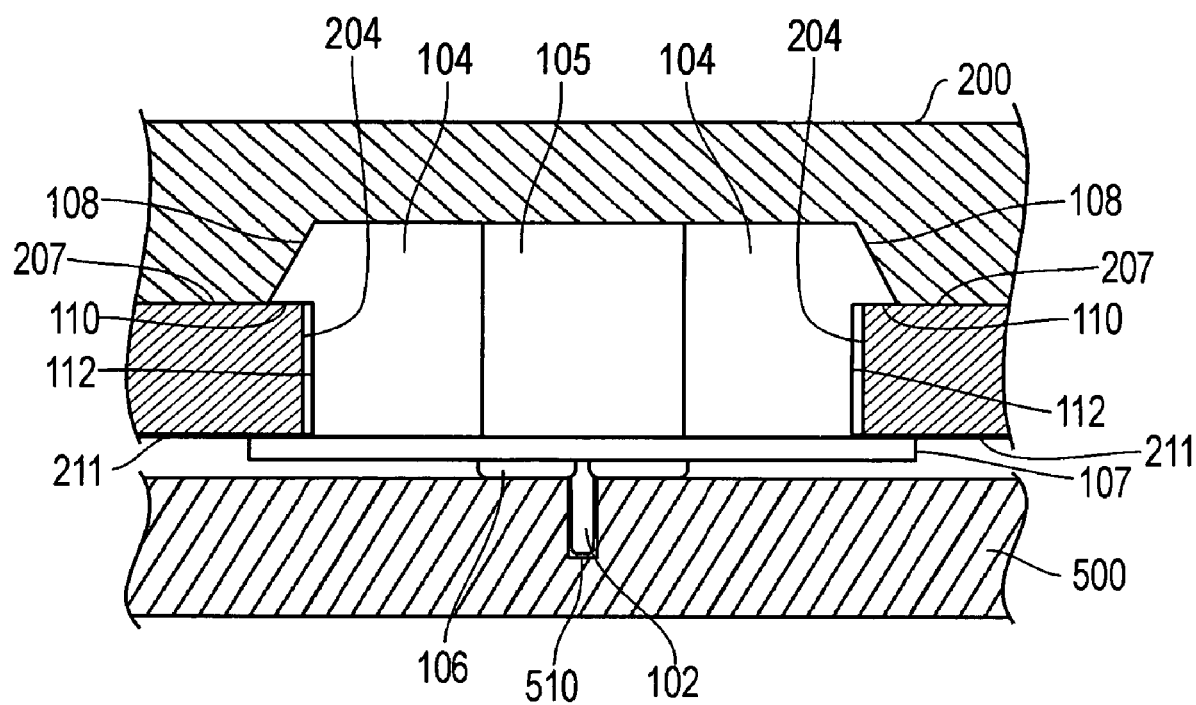
FIG. 2B shows a simplified cross-sectional side view of an isolation apparatus, mounting structure and information handling system component according to one exemplary embodiment of the disclosed systems and methods.

Referring now to the side view of FIG. 2A, isolation apparatus 100 may be characterized as having a central axis 250 that extends between the first end (i.e., insertable pin end) 260 of isolation apparatus to the second end (i.e., dampening body end) 270. As shown, body 109 is provided with two opposing snap-fit retaining features that are each configured in the form of a ramped surface 108 disposed on one of extending side sections 104 of isolation apparatus 100 in a position adjacent the second end 270 of isolation apparatus 100. As shown, each ramped surface 108 is longitudinally oriented in parallel relationship to the central axis 250 of body 109 and has a ramp slope that is angled to progressively extend further outward at greater distance from the central axis of body 109 at positions further from second end of body 109 and closer to first end of body 109. Each ramped surface 108 terminates with a step-down surface 110 that defines a respective retention channel 112, and that is configured to act to retain body 109 within a complementary-shaped opening 202 of a mounting structure 200 as shown in FIG. 2B. The slope of ramped surface 108 may be any angle or combination of angles that is suitable for allowing insertion and snap fit of isolation apparatus into a complementary opening 202 as described elsewhere herein, e.g., in one embodiment allowing isolation apparatus 100 to be inserted or pushed directly into opening 202 in a direction substantially parallel to the longitudinal axis 252 of opening 202 until it snaps into place to retain body 109 within opening 202 of mounting structure 200 without requiring sliding of the isolation apparatus in a sideways direction substantially perpendicular to the longitudinal axis 252 of opening 202, such as into a narrowed diameter portion of the opening.

Still referring to the exemplary embodiment of FIG. 2A, a portion of insertable pin 102 projects outwardly from first end 260 of body 109, with the remainder portion of insertable pin 102 being surrounded (e.g., overmolded) by dampening material body 109. In this exemplary embodiment insertable pin 102 is nail shaped, having a head portion that acts to maintain insertable pin within body 109, although any other shape of insertable pin configuration suitable for maintaining pin 102 within body 102 is possible.

Also shown in FIG. 2A are partial side views of a mounting structure (e.g., hard disk drive caddy) 200 and a information handling system component (e.g., vibration-producing component such as a hard drive) 500 shown positioned in aligned relationship to isolation apparatus 100. When employed with a chassis mounting module, and isolation apparatus 100 may be used to mount a vibration-producing component to a chassis mounting module, which is in turn itself is mounted within a chassis bay or other acceptable mounting area of an information handling system. As shown in FIG. 2A, mounting structure 200 is provided with opening 202 that is of complementary size and dimensions to accept second end 270 of dampening material body 109. In particular, opening 202 of mounting structure 200 includes a semi-cylindrical central opening portion 206 that is shaped and dimensioned to accept semi-cylindrical portion 105 of dampening material body 109, and opening 202 also includes two opposing extending side section openings 208 that are shaped and dimensioned to accept two opposing extending side sections 104 of dampening material body 109. As further shown in FIG. 2A, information handling system component 500 is provided with a complementary opening 510 for accepting insertable pin 102 of isolation apparatus 100.

Figure 3:
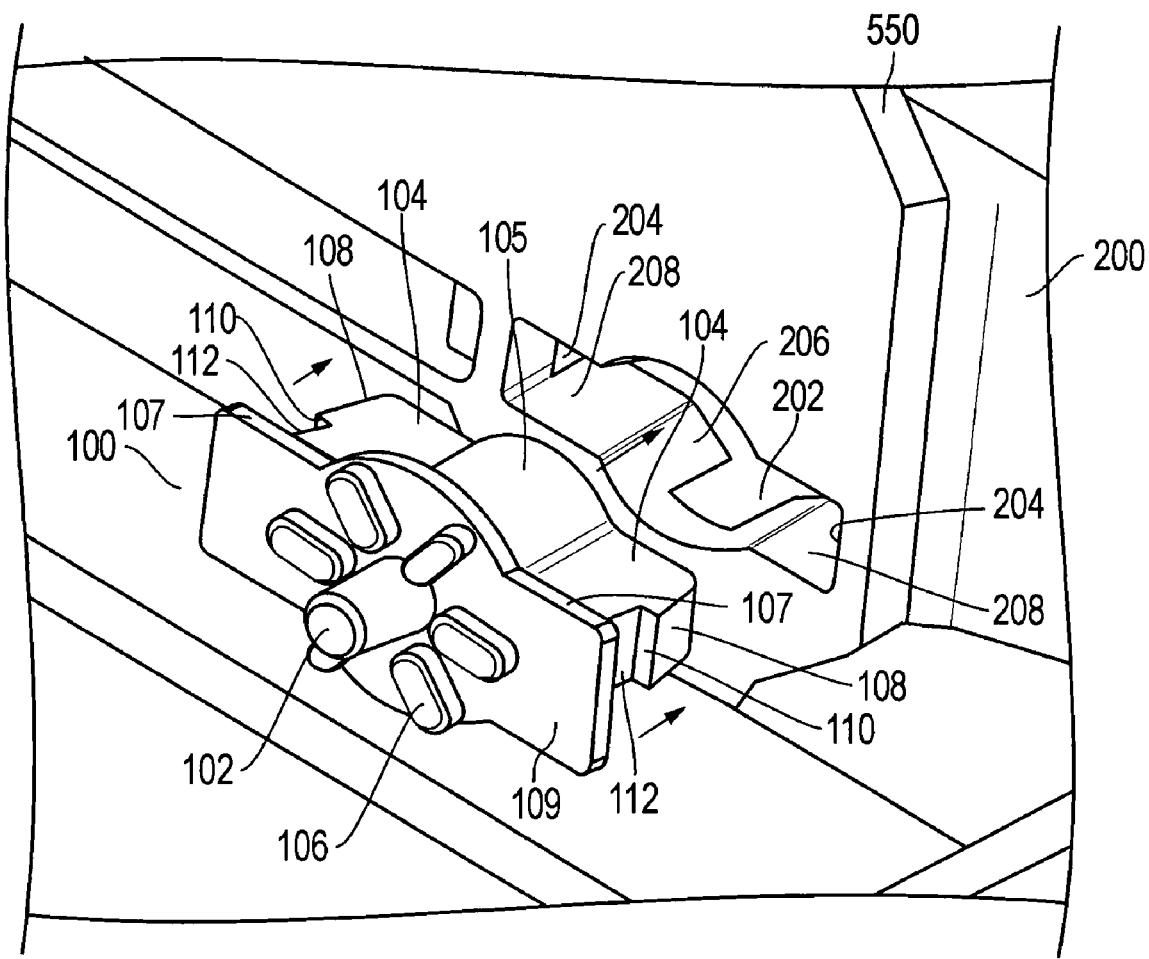
FIG. 3 shows a perspective view of an isolation apparatus positioned for such insertion into an opening according to one exemplary embodiment of the disclosed systems and methods.
Figure 4:
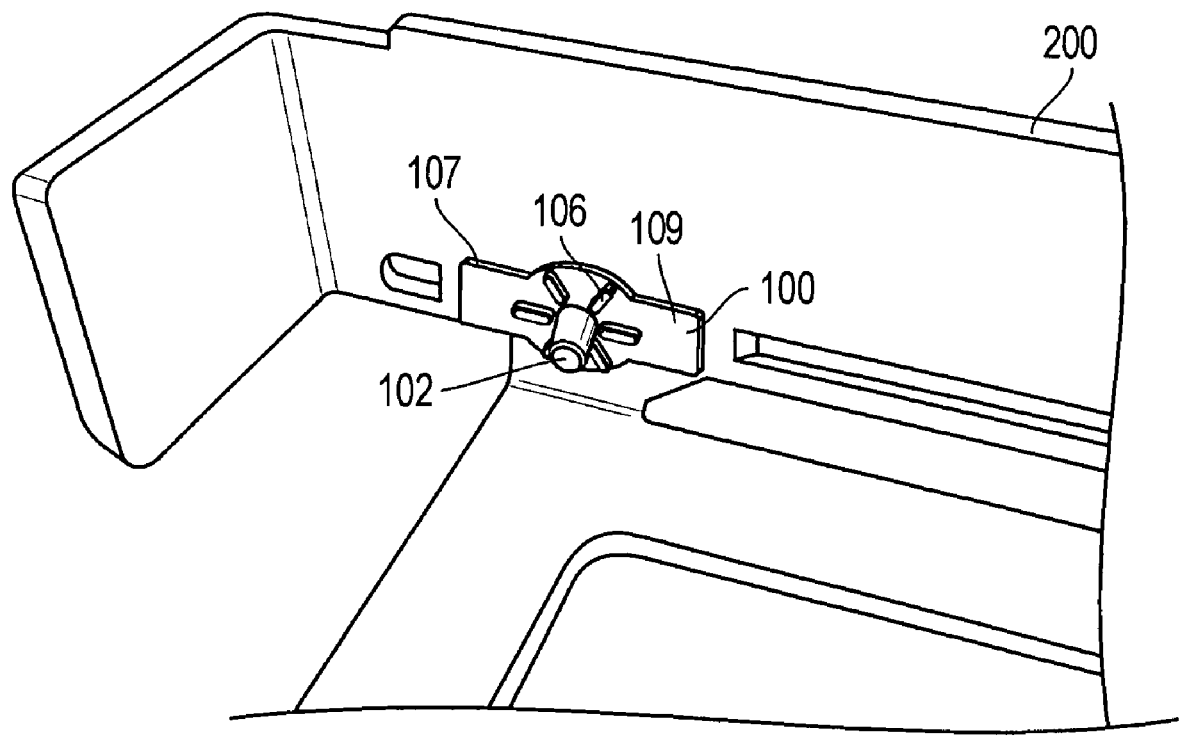
FIG. 4 shows a perspective view of an isolation apparatus and mounting structure according to one exemplary embodiment of the disclosed systems and methods.

Still referring to FIG. 2A, opening 202 of mounting structure 200 is configured with internal retaining features provided as retaining shoulders 204 that are positioned and dimensioned to be engaged by each of the insertable snap-fit retaining features of dampening body 109 when second end 270 of isolation apparatus is fully inserted into opening 202 in the directions of the arrows. FIG. 3 shows a perspective view of isolation apparatus 100 positioned for such insertion into opening 202 in the direction of the arrows. FIGS. 2B and 4 show respective cross-sectional and perspective views of isolation apparatus 100 after insertion into opening 202. It will be understood that retaining shoulders 204 represent just one exemplary embodiment of internal retaining feature configuration, and that any other configuration may be provided that is suitable for engagement with insertable retaining features to retain an isolation apparatus. For example, internal retaining features may be alternatively configured as one or more internal openings defined within the wall of an opening 202, the internal openings being dimensioned to receive and engage the insertable retaining features (e.g., snap-fit retaining features) of an isolation apparatus.

After insertion into opening 202, body 109 of isolation apparatus 100 is pushed further into opening 202 (e.g., pushed into opening 202 in a direction that is substantially perpendicular to opening 202) so that each of ramped surfaces 108 of isolation apparatus are contacted and compressed or otherwise deflected inward by a respective one of retaining shoulders 204 as body 109 is inserted into opening 202 and as each of ramped surfaces 108 slides against a respective retaining shoulder. In this regard, ramped surfaces 108 may be configured to be inwardly compressible or deflectable by virtue of an elastomeric material composition provided for body 109. However, any other configuration for rendering ramped surfaces 108 inwardly compressible or deflectable for a snap-fit may be employed, including hard non-compressible outer surface with compressible material underneath, cantilevered or spring configuration, etc. Furthermore, body 109 need not be entirely composed of a vibration dampening material such as an elastomeric material, but may be instead composed of more than type of vibration dampening materials and/or may be only partially composed of vibration dampening material/s.

Body 109 is inserted further into opening 202 until each step-down surface 110 is adjacent a retaining surface 207 of an adjacent retaining shoulder 204, at which time each of ramped surfaces 108 has passed or is completely clear of its respective retaining shoulder 204 and is therefore allowed to re-expand or "snap" outwardly so that each step-down surface 110 is positioned behind a respective retaining surface 207 as shown in FIG. 2B. In this inserted and retained position, each of retaining shoulders 204 are received in a respective retention channel 112 and body 109 is prevented from further insertion into opening 202 by virtue of the contact between insertion-limiting feature lip 107 and contact surface 211 of mounting structure 200. Body 109 is also prevented from removal from opening 202 due to contact between step-down surfaces 110 and retaining surfaces 207 of mounting structure 200. The distance between insertion-limiting lip 107 and step-down surface 110 may be selected to be substantially equal to, or slightly less than, the distance between contact surface 211 and retaining surface 207 to ensure a snug retaining fit. It will be understood that the presence of an insertion limiting feature is optional, and that in other embodiment, further insertion may be prevented by a back wall or other feature provided within opening 202 of a mounting structure 200. It will also be understood that an opening 202 may be open to allow insertion of an isolation apparatus 100 from only one direction or side.

As shown in FIG. 2B, dampening material body 109 is supported within opening 202 such that insertable pin 102 is vibrationally-isolated from internal walls of opening 202 by intervening dampening material of body 109. FIG. 2B also shows insertable pin 102 of isolation apparatus 100 as it may be received within complementary opening 510 of information handling system component 500. As so disposed between information handling system component 500 and mounting structure 200, isolation apparatus 100 acts to support and vibrationally isolate information handling system component 500 from chassis or chassis mounting module 200.

Figure 5:
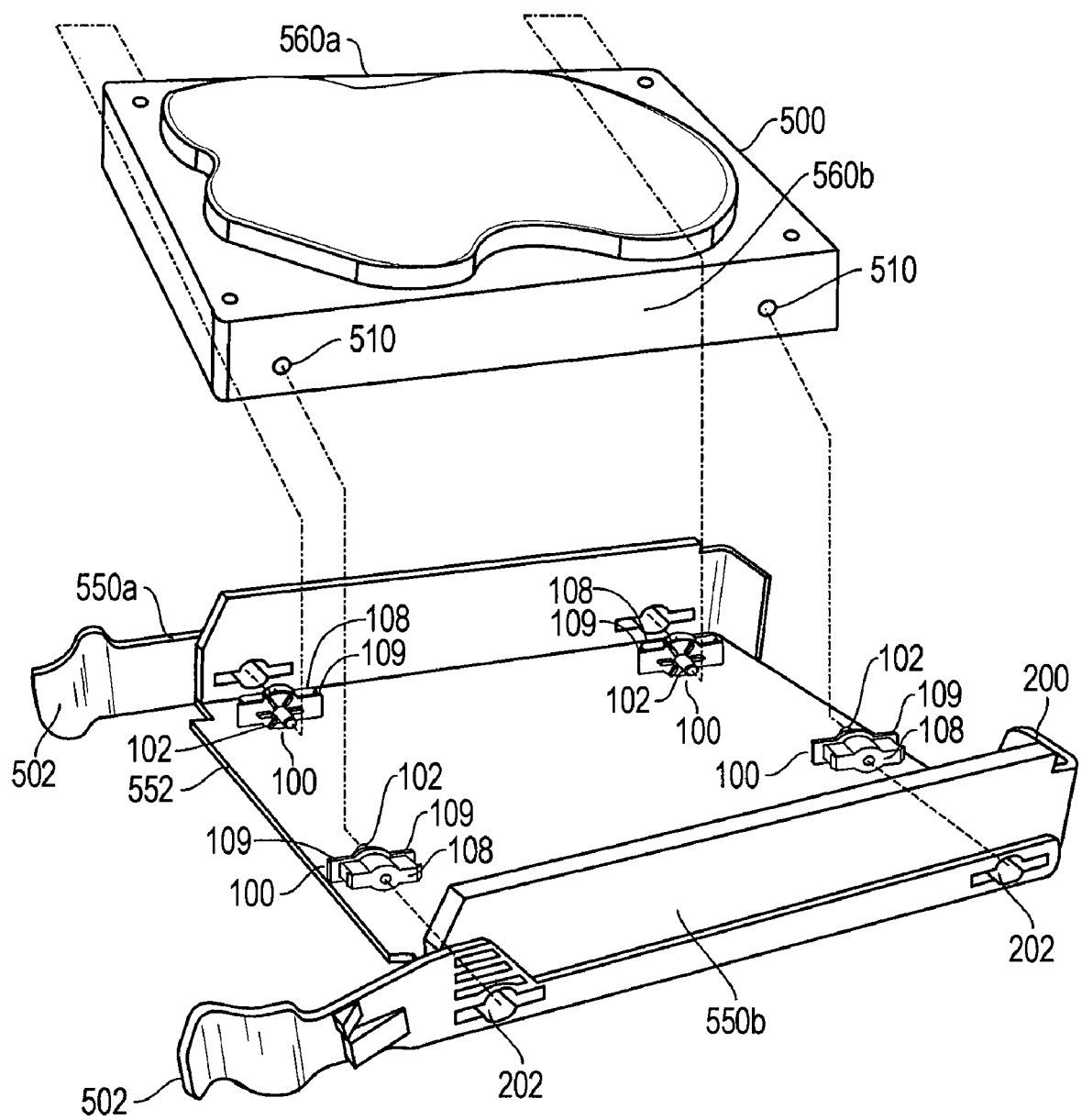
FIG. 5 shows a perspective exploded view of an information handling system component in relationship to a chassis mounting module according to one exemplary embodiment of the disclosed systems and methods.

FIG. 5 shows a perspective exploded view of an information handling system component 500 provided in the form of a hard drive in relationship to a chassis mounting module 200 provided in the form of a hard drive caddy with four isolation apparatus 100 positioned therebetween. However, it will be understood that in other embodiments an information handling system component 500 may be mounted in a similar manner directly to the chassis of an information handling system without a chassis mounting module. As shown in FIG. 5, hard drive caddy 200 includes two substantially parallel-oriented sidewalls 550a and 550b that are supported in spaced relationship by at least one cross member 552. Each of sidewalls 550a and 550b includes two openings 202 that are each provided for receiving a dampening material body 109 of a respective isolation apparatus 100. Likewise, hard drive 500 includes two opposing sides 560a and 560b, and each side 560a and 560b has two openings defined therein that each is configured for receiving an insertable pin 102 of a respective isolation apparatus. Also shown are flexible caddy extensions 502 that are provided on one end of hard drive caddy 200 that are squeezed together toward each other when inserting the caddy 200 into the chassis and released to secure the caddy 200 within the chassis.

Figure 6A:
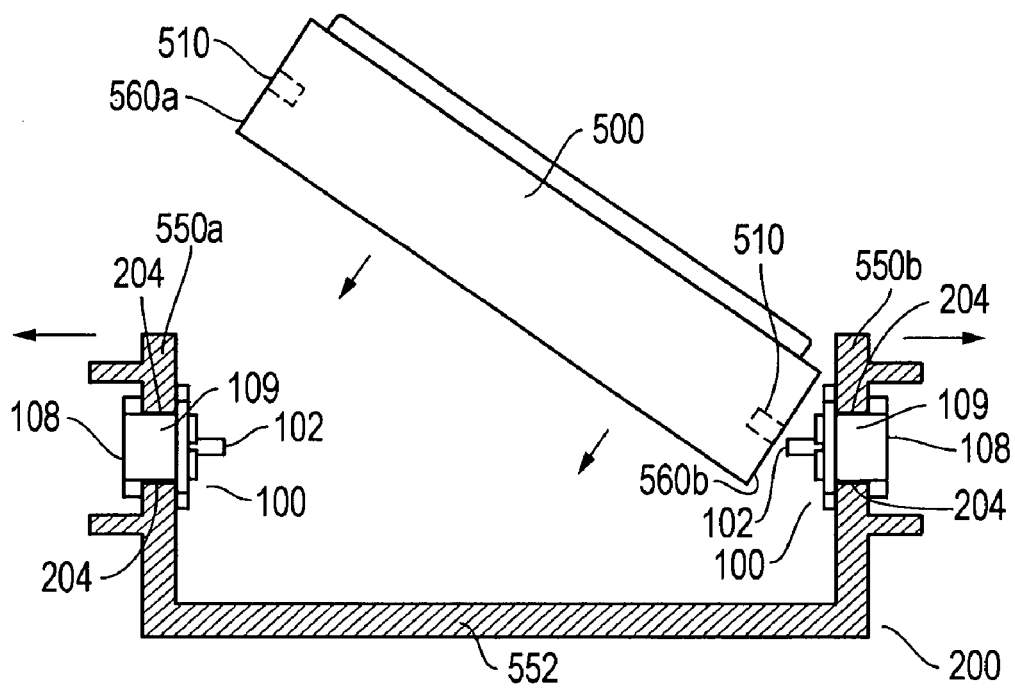
FIGS. 6A and 6B show cross-sectional end views of a hard drive as it may be mounted to hard drive caddy according FIGS. 6A and 6B according to one exemplary embodiment of the disclosed systems and methods.
Figure 6B:
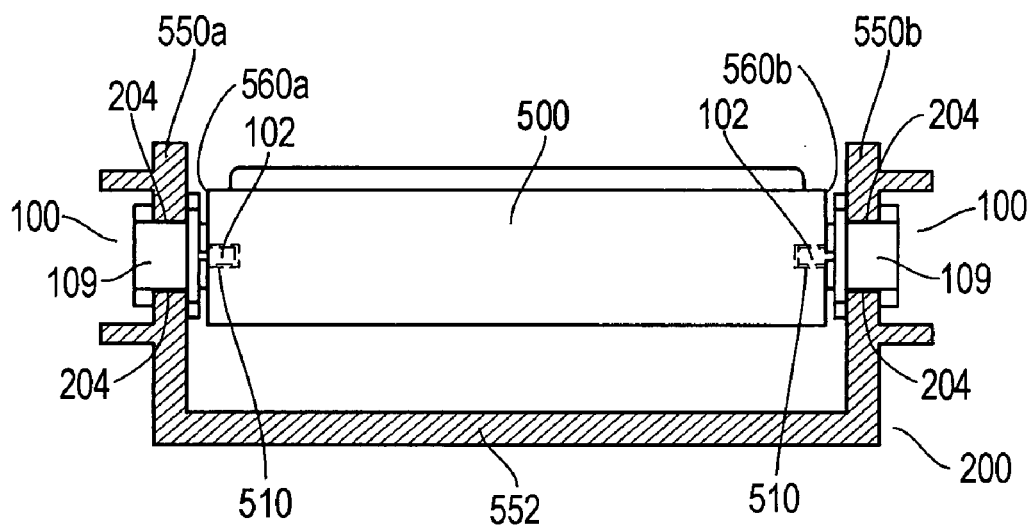
Figure 7:
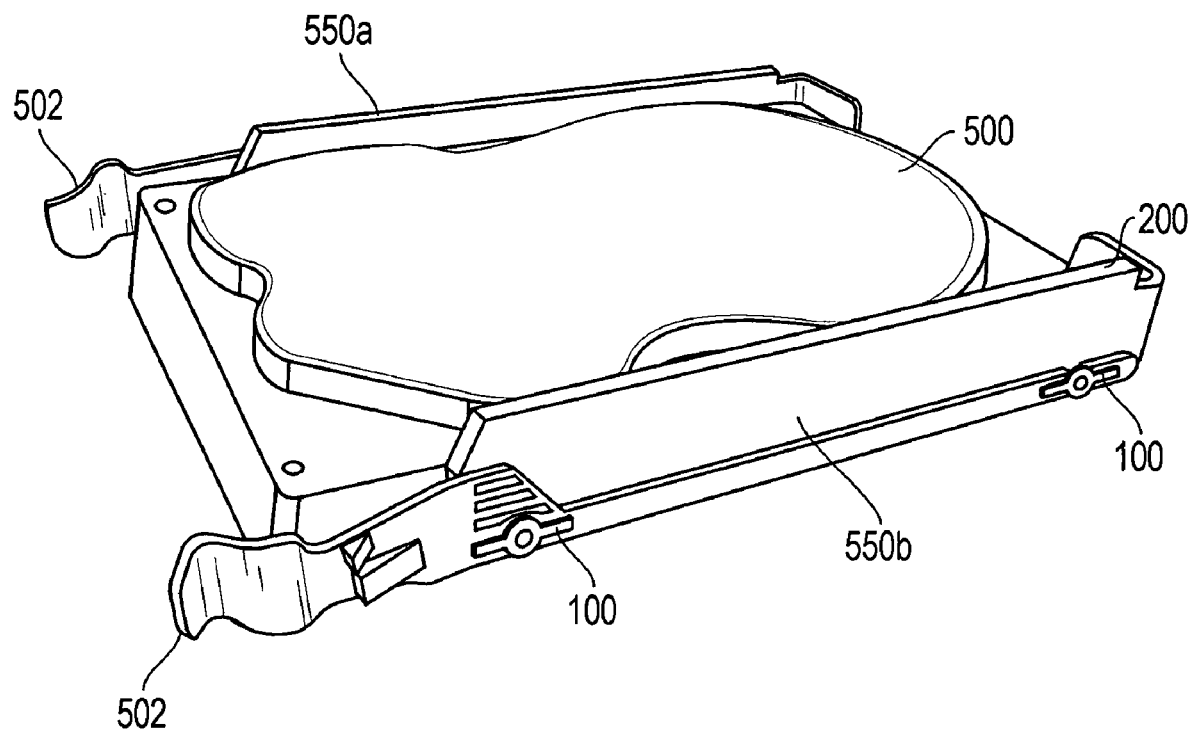
FIG. 7 shows an external perspective view of a hard drive supported and vibrationally isolated in this manner from hard a drive caddy 200 according to one exemplary embodiment of the disclosed systems and methods.

FIGS. 6A and 6B show cross-sectional end views of hard drive 500 as it may be mounted to hard drive caddy 200 of FIG. 5 in one exemplary embodiment. In this embodiment, each body 109 of four isolation apparatus 100 is first inserted and snap-fit into the four respective openings 202 of hard drive caddy 200. This insertion operation may be accomplished by hand or using robotic equipment, e.g., as part of an automated assembly process. Openings 510 on a first external side of hard drive 500 are then aligned with insertable pins 102 on a first internal side of hard drive caddy 200 and the pins slidably inserted as shown as shown in FIG. 6A. Hard drive 500 is then rotated downward in the direction of the arrows to bring the openings 510 on the second and opposing external side of hard drive 500 into alignment with insertable pins 102 on the second internal side of hard drive caddy 200. The opposing sidewalls 550a and 550b of hard drive caddy 200 may be flexed outwardly as shown by the arrows by a sufficient amount to allow clearance for insertable pins 102 on a second internal side of hard drive caddy 200 to be aligned and slidably inserted into openings 510 on the second external side of hard drive 500. In this regard, insertable pins 102 may be selected to be of sufficiently short length relative to the deflection capability of sidewalls 550a and 550b so that suitable clearance may be obtained by so flexing sidewalls 550a and 550b to allow insertion of insertable pins into openings 510 on the second external side of hard drive 500. FIG. 6B shows the assembly after opposing sides of hard drive caddy 200 are allowed to relax back to original position so that hard drive 500 is now supported and suspended within hard drive caddy 200 and without making contact with hard drive caddy 200 so that it is vibrationally isolated from hard drive caddy 200. FIG. 7 shows an external perspective view of hard drive 500 supported and vibrationally isolated in this manner from hard drive caddy 200.

It will be understood that the mounting methodology of FIGS. 6A and 6B are exemplary only, and that any other methodology that is suitable for mounting an information handling system component to a mounting structure may be employed. For example, it is possible that one or more isolation apparatus may be first attached to an information handling system component 500 (e.g., by first threading a threaded insertable pin 102 of an isolation apparatus into a corresponding internally threaded opening 510 of an information handling system component) and then attached to a mounting structure 200 (e.g., by insertion of body 109 of the isolation apparatus into a corresponding opening 202).

Figure 8:
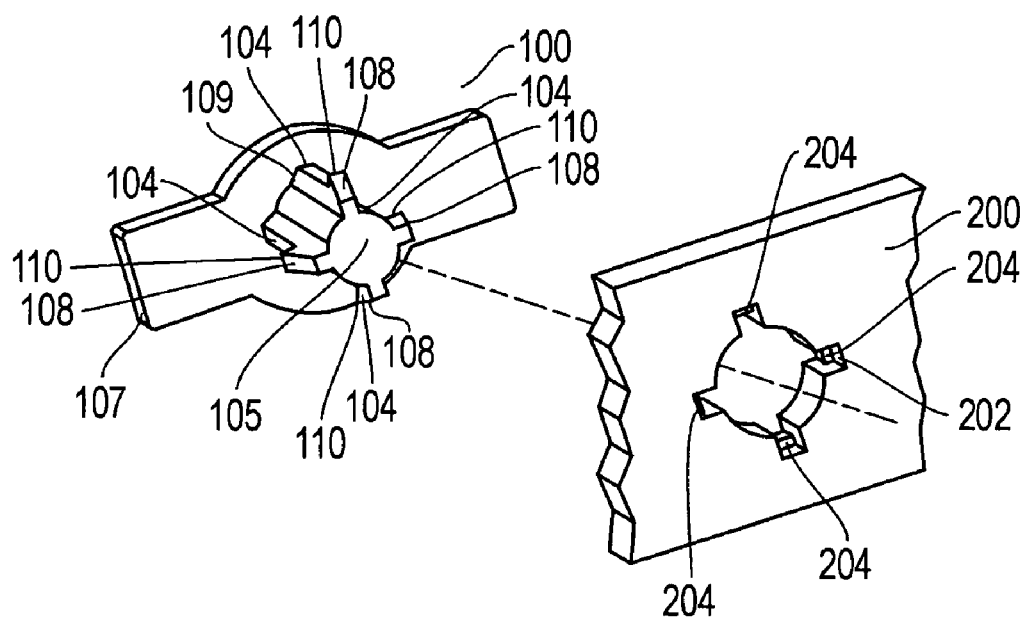
FIG. 8 illustrates a perspective view of an isolation apparatus and mounting structure according to one exemplary embodiment of the disclosed systems and methods.
Figure 9:
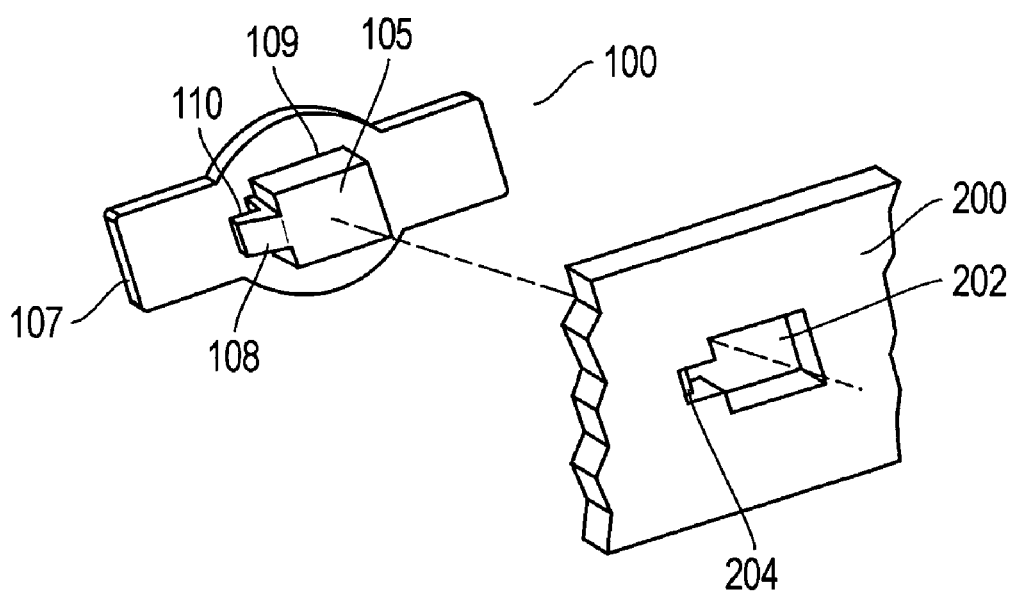
FIG. 9 illustrates a perspective view of an isolation apparatus and mounting structure according to one exemplary embodiment of the disclosed systems and methods.
Figure 10:
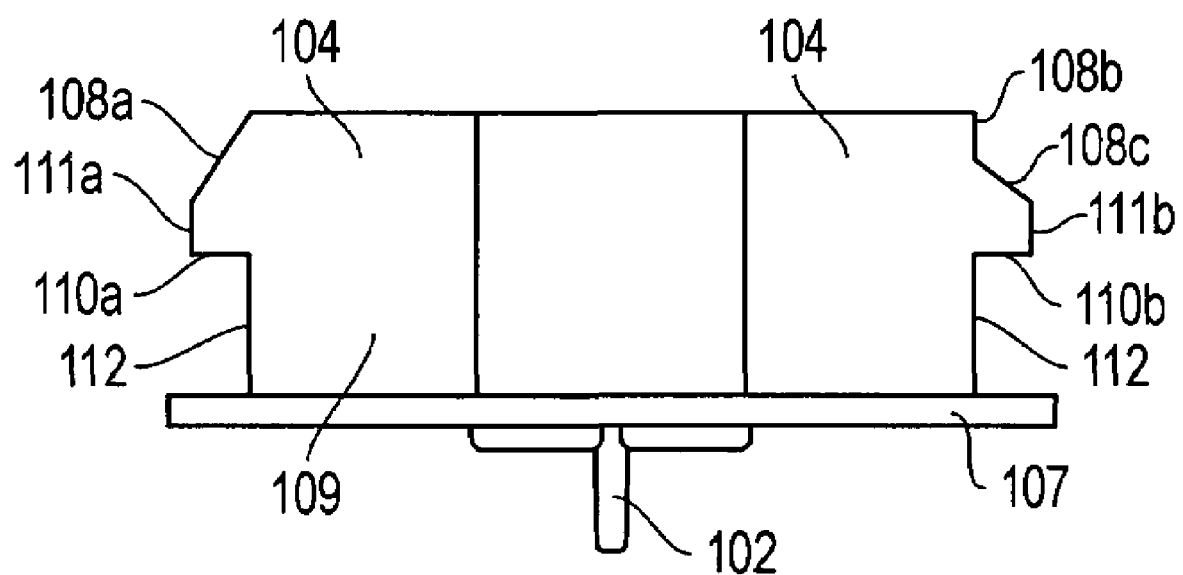
FIG. 10 illustrates a side view of an isolation apparatus according to one exemplary embodiment of the disclosed systems and methods.

It will also be understood that the illustrated embodiments of FIGS. 1-7 are exemplary only, and that isolation apparatus having greater or lesser than two retaining features may be employed, and/or that isolation apparatus having differently-shaped or configured insertable pins and/or retaining features may be employed. For example, FIG. 8 shows one embodiment of isolation apparatus 100 having an insertion profile that includes a central cylindrically-shaped portion 105 disposed in the center of four extending side sections 104 that each includes retaining features in the form of a ramped surface 108 and step-down surface 110. FIG. 9 shows one embodiment of isolation apparatus 100 having an insertion profile 105 that includes a square-shaped portion 104 with a single extending side section 104 having a single ramped surface 108 and single step-down surface 110. FIG. 10 shows one embodiment of isolation apparatus 100 having two retaining features, one of which has a partial ramped surface 108*a*, step-down surface 110*a*, and a flat surface 111*a* disposed therebetween. The other of which has a first and shallower angle ramped surface 108*b*, step down surface 110*b*, and steeper angle ramped surface 108*c* and a flat surface 111*b* therebetween.

It will also be understood that an isolation apparatus may be configured with any other insertion profile having one or more snap-fit retaining features that are suitably configured for snap-fit insertion in a manner as described elsewhere herein. For example, an insertion apparatus may be configured in one exemplary embodiment with a central portion (e.g., cylindrical-shaped, oval-shaped, rectangular or square-shaped, etc.) having one or more retaining features but with no extending side sections. One example of such an insertion profile configuration is a cylindrically-shaped central portion (or other shape of central portion) with a retaining feature (e.g., ramped surface) disposed either partially or completely (e.g., continuously) around the periphery of the central portion with no extending side section therebetween.

Figure 11:
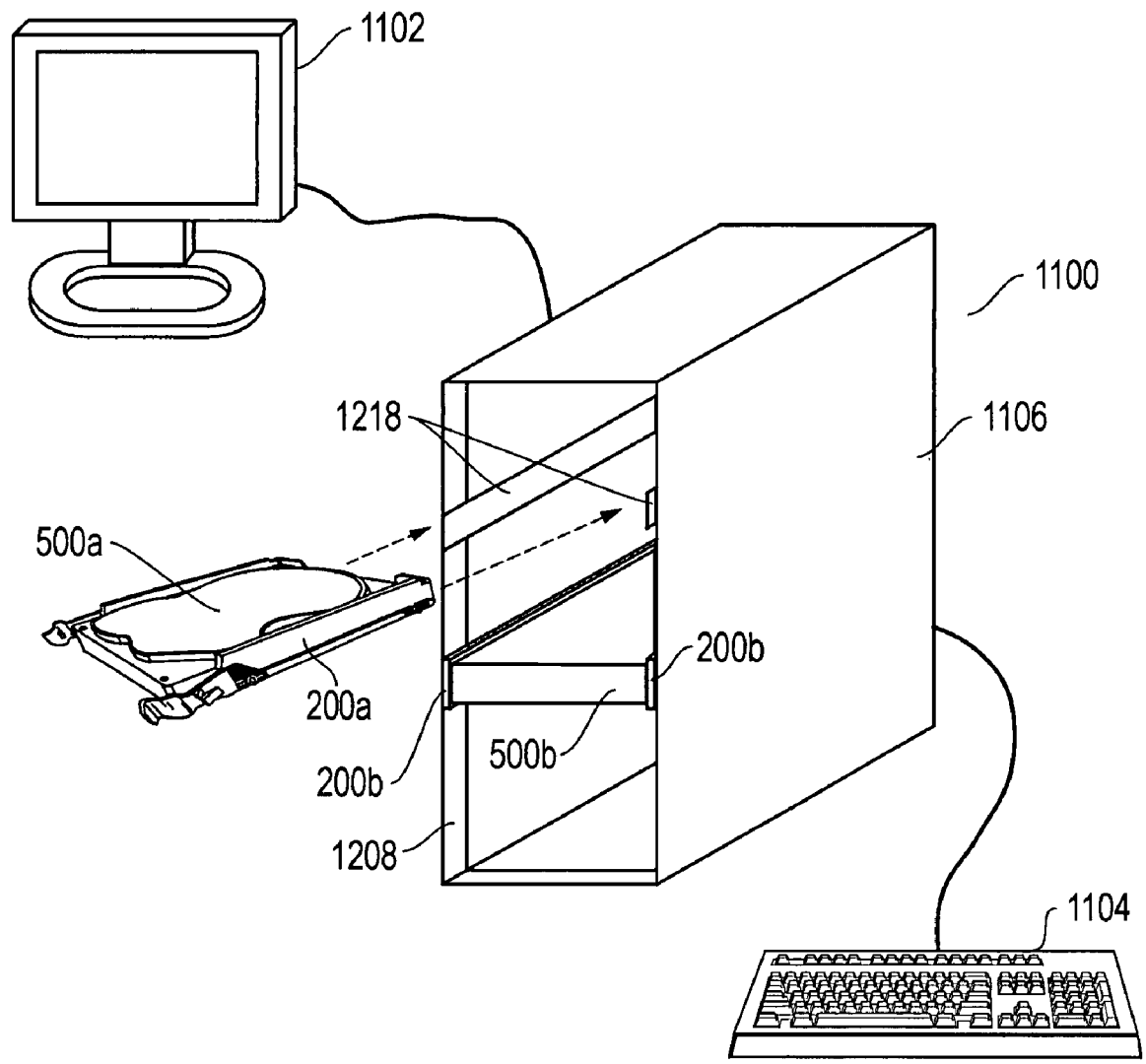
FIG. 11 shows an information handling system according to one exemplary embodiment of the disclosed systems and methods.

FIG. 11 shows an information handling system 1100 configured according to one exemplary embodiment of the disclosed systems and methods. As shown, information handling system 1100 may be a desktop computer system that includes a tower component 1106 that houses chassis components 1208, and that may be coupled to other external components, such as display 1102 and keyboard 1104. In the illustrated embodiment, a first hard data drive component 500*a* is shown mounted within a drive caddy 200*a* that is positioned for insertion into a data drive bay that is formed by chassis rails 1218. A second data drive component 500*b* is shown mounted directly to chassis components 200*b*.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   at least two isolation apparatus, each of said isolation apparatus having a first end that comprises an insertable metal pin and a second end that comprises a body of elastomeric material with a central axis extending between said first end and said second end, said elastomeric material defining an insertable snap-fit retaining feature on said second end of said isolation apparatus;
   a vibration-producing component, said vibration-producing component having first and second opposing sides, at least one opening being defined in each of said first and second sides;
   first and second sidewalls supported in spaced relationship to each other, each of said first and second sidewalls having at least one opening having a longitudinal axis defined therein, said opening being provided with at least one internal retaining feature configured to receive and retainably engage said insertable snap-fit retaining feature of one of said isolation apparatus;
   wherein said vibration-producing component is disposed between said first and second sidewalls such that said opening defined in said first side of said vibration-producing component is disposed adjacent said opening defined in said first sidewall, and such that said opening defined in said second side of said vibration-producing component is disposed adjacent said opening defined in said second sidewall;
   wherein an insertable metal pin of a first one of said isolation apparatus is at least partially received in said opening defined in said first side of said vibration-producing component, wherein a body of said first one of said isolation apparatus is at least partially received in said opening defined in said first sidewall by direct insertion of the second end of said first one of said isolation apparatus into said opening defined in said first sidewall in a direction substantially parallel to the longitudinal axis of said opening defined in said first sidewall and substantially parallel to said central axis extending between said first end and said second end of said isolation apparatus, and wherein said internal retaining feature of said opening defined in said first sidewall is retainably engaged by said insertable snap-fit retaining feature of said first one of said isolation apparatus;
   wherein an insertable metal pin of a second one of said isolation apparatus is at least partially received in said opening defined in said second side of said vibration-producing component, wherein a body of said second one of said isolation apparatus is at least partially received in said opening defined in said second sidewall by direct insertion of the second end of said second one of said isolation apparatus into said opening defined in said second sidewall in a direction substantially parallel to the longitudinal axis of said opening defined in said second sidewall and substantially parallel to said central axis extending between said first end and said second end of said isolation apparatus, and wherein said internal retaining feature of said opening defined in said second sidewall is retainably engaged by said insertable snap-fit retaining feature of said second one of said isolation apparatus; and
   wherein said vibration-producing component is substantially vibrationally isolated from said first and second sidewalls.

2. The information handling system of claim 1, wherein said information handling system component comprises a data drive component; and wherein said first and second sidewalls are coupled to an information handling system chassis.

3. The information handling system of claim 2, further comprising a drive caddy coupled to said information handling system chassis, said drive caddy comprising said first and second sidewalls.

4. The information handling system of claim 2, comprising four isolation apparatus, each of said four isolation apparatus having a first end that comprises an insertable metal pin and a second end that comprises a body of elastomeric material, said elastomeric material defining an insertable snap-fit retaining feature on said second end of said isolation apparatus; wherein said vibration-producing component comprises two openings defined on each of said first and second sides; wherein each of said first and second sidewalls has two openings having a longitudinal axis defined therein, each of said openings being provided with at least one internal retaining feature configured to receive and retainably engage an insertable snap-fit retaining feature of one of said isolation apparatus; wherein said vibration handling system component is disposed between said first and second sidewalls such that each said two openings defined in said first side of said vibration handling system component is disposed adjacent one of said two openings defined in said first sidewall, and such that each of said two openings defined in said second side of said vibration handling system component is disposed adjacent each of said two openings defined in said second sidewall; and wherein an insertable pin of a respective one of said isolation apparatus is at least partially received in each of said openings defined in said first or second sides of said vibration handling system component, wherein a body of said respective one of said isolation apparatus is at least partially received in a corresponding adjacent opening defined in said first or second sidewall by direct insertion of the second end of said respective one of said isolation apparatus into said opening defined in said first or second sidewall in a direction substantially parallel to the longitudinal axis of said opening defined in said first of second sidewall; and wherein said internal retaining feature of said corresponding adjacent opening defined in said first or second sidewall is retainably engaged by said insertable snap-fit retaining feature of said respective one of said isolation apparatus.

5. The information handling system of claim 1, wherein each of said isolation apparatus comprises at least one extending side section adjacent said second end of said isolation apparatus; wherein said snap-fit retaining feature of each of said isolation apparatus comprises a ramped surface disposed on said extending side section at said second end of said isolation apparatus, and a step-down surface defining a retention channel between said ramped surface and said first end of said isolation apparatus; and wherein said internal retaining feature of each of said first and second sidewalls comprises a retaining shoulder, said retaining shoulder being received in said retention channel of a respective one of said isolation apparatus.

6. The information handling system of claim 1, wherein each of said isolation apparatus comprises two opposing extending side sections adjacent said second end of said isolation apparatus, each of said two opposing extending side sections comprising a snap-fit retaining feature; wherein each of said snap fit retaining features comprises a ramped surface disposed on a given one of said opposing extending side sections at said second end of said isolation apparatus, and a step-down surface defining a retention channel between said ramped surface and said first end of said isolation apparatus to form two opposing retention channels; and wherein said internal retaining features of each of said first and second sidewalls comprises two opposing retaining shoulders, each of said two opposing retaining shoulders being respectively received in said opposing retention channels of a respective one of said isolation apparatus.

7. An assembly for an information handling system, comprising:
an information handling system component, said information handling system component having at least one opening defined therein;
at least one isolation apparatus having first and second opposing ends with a central axis extending between said first end and said second end and comprising a body of vibration-dampening material, an insertable pin extending from said first end of said isolation apparatus, and at least one insertable snap-fit retaining feature provided adjacent said second end of said isolation apparatus;
a mounting structure having at least one opening having a longitudinal axis defined therein, said opening provided with at least one internal retaining feature configured to receive and retainably engage said insertable snap-fit retaining feature of said isolation apparatus;
wherein said insertable pin of said isolation apparatus is at least partially received in said at least one opening defined in said information handling system component; and
wherein said body of said isolation apparatus is at least partially received in said at least one opening of said mounting structure by direct insertion of the second end of said isolation apparatus into said at least one opening defined in said mounting structure in a direction substantially parallel to the longitudinal axis of said opening defined in said mounting structure and wherein said internal retaining feature of said mounting structure opening is retainably engaged by said insertable snap-fit retaining feature of said isolation apparatus.

8. The assembly of claim 7, wherein said isolation apparatus comprises an insertable metal pin coupled to a body of elastomeric vibration-dampening material.

9. The assembly of claim 7, wherein said insertable metal pin is overmolded by said body of elastomeric vibration-dampening material.

10. The assembly of claim 7, wherein said information handling system component comprises a vibration-inducing component; and wherein said mounting structure comprises at least one of an information handling system chassis or a chassis mounting module for an information handling system.

11. The assembly of claim 7, wherein said information handling system component comprises a data drive component; and wherein said mounting structure comprises a drive caddy for said data drive component.

12. The assembly of claim 7, comprising at least two isolation apparatus, each of said isolation apparatus having first and second opposing ends and comprising a body of vibration-dampening material, an insertable pin extending from said first end of each of said isolation apparatus, and at least one insertable snap-fit retaining feature provided adjacent said second end of each of said isolation apparatus;
wherein said mounting structure comprises first and second sidewalls supported in spaced relationship by at least one cross member, each of said first and second sidewalls having at least one opening having a longitudinal axis defined therein, said opening being provided with at least one internal retaining feature configured to receive and retainably engage an insertable snap-fit retaining feature of one of said isolation apparatus;

wherein said information handling system component comprises first and second opposing sides, at least one opening being defined in each of said first and second sides;

wherein said information handling system component is disposed between said first and second sidewalls of said mounting structure such that said opening defined in said first side of said information handling system component is disposed adjacent said opening defined in said first sidewall of said mounting structure, and such that said opening defined in said second side of said information handling system component is disposed adjacent said opening defined in said second sidewall of said mounting structure;

wherein an insertable pin of a first one of said isolation apparatus is at least partially received in said opening defined in said first side of said information handling system component, wherein a body of said first one of said isolation apparatus is at least partially received in said opening defined in said first sidewall of said mounting structure by direct insertion of the second end of said first one of said isolation apparatus into said at least one opening defined in said first sidewall of said mounting structure in a direction substantially parallel to the longitudinal axis of said opening defined in said first sidewall of said mounting structure, and wherein said internal retaining feature of said opening defined in said first sidewall of said mounting structure is retainably engaged by said insertable snap-fit retaining feature of said first one of said isolation apparatus; and wherein an insertable pin of a second one of said isolation apparatus is at least partially received in said opening defined in said second side of said information handling system component, wherein a body of said second one of said isolation apparatus is at least partially received in said opening defined in said second sidewall of said mounting structure by direct insertion of the second end of said second one of said isolation apparatus into said at least one opening defined in said second sidewall of said mounting structure in a direction substantially parallel to the longitudinal axis of said opening defined in said second sidewall of said mounting structure, and wherein said internal retaining feature of said opening defined in said second sidewall of said mounting structure is retainably engaged by said insertable snap-fit retaining feature of said second one of said isolation apparatus.

13. The assembly of claim 12, comprising four isolation apparatus, each of said four isolation apparatus having first and second opposing ends and comprising a body of vibration-dampening material, an insertable pin extending from said first end of each of said isolation apparatus, and at least one insertable snap-fit retaining feature provided adjacent said second end of each of said isolation apparatus; wherein said information handling system component comprises two openings defined in each of said first and second sides; wherein each of said first and second sidewalls of said mounting structure has two openings that each has a longitudinal axis defined therein, each of said mounting structure openings being provided with at least one internal retaining feature configured to receive and retainably engage an insertable snap-fit retaining feature of one of said isolation apparatus; wherein said information handling system component is disposed between said first and second sidewalls of said mounting structure such that each said two openings defined in said first side of said information handling system component is disposed adjacent one of said two openings defined in said first sidewall of said mounting structure, and such that each of said two openings defined in said second side of said information handling system component is disposed adjacent each of said two openings defined in said second sidewall of said mounting structure; and wherein an insertable pin of a respective one of said isolation apparatus is at least partially received in each of said openings defined in said first or second sides of said information handling system component, wherein a body of said respective one of said isolation apparatus is at least partially received in a corresponding adjacent opening defined in said first or second sidewall of said mounting structure by direct insertion of the second end of said respective one of said isolation apparatus into said corresponding adjacent opening defined in said first or second sidewall of said mounting structure in a direction substantially parallel to the longitudinal axis of said corresponding adjacent opening defined in said first or second sidewall of said mounting structure; and wherein said internal retaining feature of said corresponding adjacent opening defined in said first or second sidewall of said mounting structure is retainably engaged by said insertable snap-fit retaining feature of said respective one of said isolation apparatus.

14. A method for mounting an information handling system component, comprising:

providing an information handling system component, said information handling system component having at least one opening defined therein;

providing at least one isolation apparatus having first and second opposing ends with a central axis extending between said first end and said second end and comprising a body of vibration-dampening material, an insertable pin extending from said first end of said isolation apparatus, and at least one insertable snap-fit retaining feature provided adjacent said second end of said isolation apparatus;

providing a mounting structure having at least one opening having a longitudinal axis defined therein, said opening provided with at least one internal retaining feature configured to receive and retainably engage said insertable snap-fit retaining feature of said isolation apparatus;

directly inserting said second end of said isolation apparatus at least partially into said at least one opening of said mounting structure in a direction substantially parallel to the longitudinal axis of said opening defined in said mounting structure such that said internal retaining feature of said mounting structure opening is retainably engaged by said insertable snap-fit retaining feature of said isolation apparatus; and inserting said insertable pin of said isolation apparatus is at least partially into said at least one opening defined in said information handling system component.

15. The method of claim 14, wherein said isolation apparatus comprises an insertable metal pin coupled to a body of elastomeric vibration-dampening material.

16. The method of claim 14, wherein said information handling system component comprises a vibration-inducing component; and wherein said mounting structure comprises at least one of an information handling system chassis or a chassis mounting module for an information handling system.

17. The method of claim 14, wherein said information handling system component comprises a data drive component; and wherein said mounting structure comprises a drive caddy for said data drive component; and wherein said method further comprises installing said drive caddy into a chassis bay of an information handling system.

18. The method of claim 14, wherein said mounting structure comprises first and second sidewalls supported in spaced relationship by at least one cross member, each of said first and second sidewalls having at least one opening having a longitudinal axis defined therein, said opening being provided with at least one internal retaining feature configured to receive and retainably engage an insertable snap-fit retaining feature of one of said isolation apparatus; wherein said information handling system component comprises first and second opposing sides, at least one opening being defined in each of said first and second sides; and wherein said method further comprises:

providing at least two isolation apparatus, each of said isolation apparatus having first and second opposing ends and comprising a body of vibration-dampening material, an insertable pin extending from said first end of each of said isolation apparatus, and at least one insertable snap-fit retaining feature provided adjacent said second end of each of said isolation apparatus;

disposing said information handling system component between said first and second sidewalls of said mounting structure such that said opening defined in said first side of said information handling system component is disposed adjacent said opening defined in said first sidewall of said mounting structure, and such that said opening defined in said second side of said information handling system component is disposed adjacent said opening defined in said second sidewall of said mounting structure;

inserting an insertable pin of a first one of said isolation apparatus at least partially into said opening defined in said first side of said information handling system component such that the second end of said first one of said isolation apparatus is at least partially received by direct insertion in said opening defined in said first sidewall of said mounting structure in a direction substantially parallel to the longitudinal axis of said opening defined in said first sidewall of said mounting structure, and such that said internal retaining feature of said opening defined in said first sidewall of said mounting structure is retainably engaged by said insertable snap-fit retaining feature of said first one of said isolation apparatus; and inserting an insertable pin of a second one of said isolation apparatus at least partially into said opening defined in said second side of said information handling system component such that the second end of said second one of said isolation apparatus is at least partially received by direct insertion in said opening defined in said second sidewall of said mounting structure in a direction substantially parallel to the longitudinal axis of said opening defined in said first sidewall of said mounting structure, and such that said internal retaining feature of said opening defined in said second sidewall of said mounting structure is retainably engaged by said insertable snap-fit retaining feature of said second one of said isolation apparatus.

19. The method of claim 18, wherein said information handling system component comprises two openings defined in each of said first and second sides; herein each of said first and second sidewalls of said mounting structure has two openings that each has a longitudinal axis defined therein, each of said mounting structure openings being provided with at least one internal retaining feature configured to receive and retainably engage an insertable snap-fit retaining feature of one of said isolation apparatus; and wherein said method further comprises:

providing four isolation apparatus, each of said four isolation apparatus having first and second opposing ends and comprising a body of vibration-dampening material, an insertable pin extending from said first end of each of said isolation apparatus, and at least one insertable snap-fit retaining feature provided adjacent said second end of each of said isolation apparatus;

disposing said information handling system component between said first and second sidewalls of said mounting structure such that each said two openings defined in said first side of said information handling system component is disposed adjacent one of said two openings defined in said first sidewall of said mounting structure, and such that each of said two openings defined in said second side of said information handling system component is disposed adjacent each of said two openings defined in said second sidewall of said mounting structure;

inserting an insertable pin of a respective one of said isolation apparatus at least partially into each of said openings defined in said first or second sides of said information handling system component; and directly inserting a second end of said respective one of said isolation apparatus at least partially into a corresponding adjacent opening defined in said first or second sidewall of said mounting structure in a direction substantially parallel to the longitudinal axis of said corresponding adjacent opening defined in said first or second sidewall of said mounting structure such that said internal retaining feature of said corresponding adjacent opening defined in said first or second sidewall of said mounting structure is retainably engaged by said insertable snap-fit retaining feature of said respective one of said isolation apparatus.

20. The method of claim 19, said method further comprising:

providing each of said isolation apparatus such that it comprises two opposing extending side sections adjacent said second end of said isolation apparatus, each of said two opposing extending side sections comprising a snap-fit retaining feature, wherein each of said snap fit retaining features comprises a ramped surface disposed on a given one of said opposing extending side sections at said second end of said isolation apparatus, and a step-down surface defining a retention channel between said ramped surface and said first end of said isolation apparatus to form two opposing retention channels, and wherein said internal retaining features of each of said first and second sidewalls comprises two opposing retaining shoulders; and directly inserting a body of said respective one of said isolation apparatus at least partially into a corresponding adjacent opening defined in said first or second sidewall of said mounting structure in a direction substantially parallel to the longitudinal axis of said corresponding adjacent opening defined in said first or second sidewall of said mounting structure such that said internal retaining feature of said corresponding adjacent opening defined in said first or second sidewall of said mounting structure is retainably engaged by said retention channels of said insertable snap-fit retaining feature of said respective one of said isolation apparatus.

21. An information handling system, comprising:
at least two isolation apparatus, each of said isolation apparatus having a first end that comprises an insertable metal pin and a second end that comprises a body of elastomeric material, said elastomeric material defining an insertable snap-fit retaining feature on said second end of said isolation apparatus;
a vibration-producing component, said vibration-producing component having first and second opposing sides, at least one opening being defined in each of said first and second sides;
first and second sidewalls supported in spaced relationship to each other, each of said first and second sidewalls having at least one opening defined therein, said opening being provided with at least one internal retaining feature configured to receive and retainably engage said insertable snap-fit retaining feature of one of said isolation apparatus;
wherein said vibration-producing component is disposed between said first and second sidewalls such that said opening defined in said first side of said vibration-producing component is disposed adjacent said opening defined in said first sidewall, and such that said opening defined in said second side of said vibration-producing component is disposed adjacent said opening defined in said second sidewall;
wherein an insertable metal pin of a first one of said isolation apparatus is at least partially received in said opening defined in said first side of said vibration-producing component, wherein a body of said first one of said isolation apparatus is at least partially received in said opening defined in said first sidewall, and wherein said internal retaining feature of said opening defined in said first sidewall is retainably engaged by said insertable snap-fit retaining feature of said first one of said isolation apparatus;
wherein an insertable metal pin of a second one of said isolation apparatus is at least partially received in said opening defined in said second side of said vibration-producing component, wherein a body of said second one of said isolation apparatus is at least partially received in said opening defined in said second sidewall, and wherein said internal retaining feature of said opening defined in said second sidewall is retainably engaged by said insertable snap-fit retaining feature of said second one of said isolation apparatus; and
wherein said vibration-producing component is substantially vibrationally isolated from said first and second sidewalls; and
wherein each of said isolation apparatus comprises two opposing extending side sections adjacent said second end of said isolation apparatus, each of said two opposing extending side sections comprising a snap-fit retaining feature; wherein each of said snap fit retaining features comprises a ramped surface disposed on a given one of said opposing extending side sections adjacent said second end of said isolation apparatus, and a step-down surface defining a retention channel between said ramped surface and said first end of said isolation apparatus to form two opposing retention channels; and wherein said internal retaining features of each of said first and second sidewalls comprises two opposing retaining shoulders, each of said two opposing retaining shoulders being respectively received in said opposing retention channels of a respective one of said isolation apparatus.

22. A method for mounting an information handling system component, comprising:
providing an information handling system component, said information handling system component having at least one opening defined therein;
providing at least one isolation apparatus having first and second opposing ends and comprising a body of vibration-dampening material, an insertable pin extending from said first end of said isolation apparatus, and at least one insertable snap-fit retaining feature provided adjacent said second end of said isolation apparatus;
providing a mounting structure having at least one opening defined therein, said opening provided with at least one internal retaining feature configured to receive and retainably engage said insertable snap-fit retaining feature of said isolation apparatus;
inserting said body of said isolation apparatus at least partially into said at least one opening of said mounting structure such that said internal retaining feature of said mounting structure opening is retainably engaged by said insertable snap-fit retaining feature of said isolation apparatus; and
inserting said insertable pin of said isolation apparatus is at least partially into said at least one opening defined in said information handling system component;
wherein said mounting structure comprises first and second sidewalls supported in spaced relationship by at least one cross member, each of said first and second sidewalls having at least one opening defined therein, said opening being provided with at least one internal retaining feature configured to receive and retainably engage an insertable snap-fit retaining feature of one of said isolation apparatus; wherein said information handling system component comprises first and second opposing sides, at least one opening being defined in each of said first and second sides, and wherein said method further comprises:
providing at least two isolation apparatus, each of said isolation apparatus having first and second opposing ends and comprising a body of vibration-dampening material, an insertable pin extending from said first end of each of said isolation apparatus, and at least one insertable snap-fit retaining feature provided adjacent said second end of each of said isolation apparatus,
disposing said information handling system component between said first and second sidewalls of said mounting structure such that said opening defined in said first side of said information handling system component is disposed adjacent said opening defined in said first sidewall of said mounting structure, and such that said opening defined in said second side of said information handling system component is disposed adjacent said opening defined in said second sidewall of said mounting structure,
inserting an insertable pin of a first one of said isolation apparatus at least partially into said opening defined in said first side of said information handling system component such that a body of said first one of said isolation apparatus is at least partially received in said opening defined in said first sidewall of said mounting structure, and such that said internal retaining feature of said opening defined in said first sidewall of said mounting structure is retainably engaged by said insertable snap-fit retaining feature of said first one of said isolation apparatus, and
inserting an insertable pin of a second one of said isolation apparatus at least partially into said opening defined in said second side of said information handling system component such that a body of said second one of said isolation apparatus is at least partially received in said opening defined in said second sidewall of said mounting structure, and such that said internal retaining feature of said opening defined in said second sidewall of said mounting structure is retainably engaged by said insertable snap-fit retaining feature of said second one of said isolation apparatus;

wherein said information handling system component comprises two openings defined in each of said first and second sides; wherein each of said first and second sidewalls of said mounting structure has two openings defined therein, each of said mounting structure openings being provided with at least one internal retaining feature configured to receive and retainably engage an insertable snap-fit retaining feature of one of said isolation apparatus, and wherein said method further comprises:

providing four isolation apparatus, each of said four isolation apparatus having first and second opposing ends and comprising a body of vibration-dampening material, an insertable pin extending from said first end of each of said isolation apparatus, and at least one insertable snap-fit retaining feature provided adjacent said second end of each of said isolation apparatus, disposing said information handling system component between said first and second sidewalls of said mounting structure such that each said two openings defined in said first side of said information handling system component is disposed adjacent one of said two openings defined in said first sidewall of said mounting structure, and such that each of said two openings defined in said second side of said information handling system component is disposed adjacent each of said two openings defined in said second sidewall of said mounting structure, inserting an insertable pin of a respective one of said isolation apparatus at least partially into each of said openings defined in said first or second sides of said information handling system component, and inserting a body of said respective one of said isolation apparatus at least partially into a corresponding adjacent opening defined in said first or second sidewall of said mounting structure such that said internal retaining feature of said corresponding adjacent opening defined in said first or second sidewall of said mounting structure is retainably engaged by said insertable snap-fit retaining feature of said respective one of said isolation apparatus; and wherein said method further comprises:

providing each of said isolation apparatus such that it comprises two opposing extending side sections adjacent said second end of said isolation apparatus, each of said two opposing extending side sections comprising a snap-fit retaining feature, wherein each of said snap fit retaining features comprises a ramped surface disposed on a given one of said opposing extending side sections adjacent said second end of said isolation apparatus, and a step-down surface defining a retention channel between said ramped surface and said first end of said isolation apparatus to form two opposing retention channels, and wherein said internal retaining features of each of said first and second sidewalls comprises two opposing retaining shoulders, and inserting a body of said respective one of said isolation apparatus at least partially into a corresponding adjacent opening defined in said first or second sidewall of said mounting structure such that said internal retaining feature of said corresponding adjacent opening defined in said first or second sidewall of said mounting structure is retainably engaged by said retention channels of said insertable snap-fit retaining feature of said respective one of said isolation apparatus.

* * * * *